(12) United States Patent
Intravatola (10) Patent No.: US 6,733,017 B2
(45) Date of Patent: May 11, 2004

(54) GAS CYLINDER CART WITH REMOVABLE CONTROL PANEL

(75) Inventor: Lawrence Shane Intravatola, Virginia Beach, VA (US)

(73) Assignee: Air Systems, Inc., Chesapeake, VA (US)

( * ) Notice: Subject to any disclaimer, the term of this patent is extended or adjusted under 35 U.S.C. 154(b) by 100 days.

(21) Appl. No.: 10/222,533

(22) Filed: Aug. 15, 2002

(65) Prior Publication Data

US 2003/0052466 A1 Mar. 20, 2003

Related U.S. Application Data

(60) Provisional application No. 60/322,711, filed on Sep. 14, 2001.

(51) Int. Cl.[7] .................................................. B62B 1/00
(52) U.S. Cl. ..................................... 280/79.6; 280/47.26
(58) Field of Search ............................ 280/79.6, 47.26, 280/47.27, 47.28, 79.4, 79.5, 651, 652, 47.24; D34/24, 25, 26, 27

(56) References Cited

U.S. PATENT DOCUMENTS

| 2,381,858 | A | | 8/1945 | Austin | |
|---|---|---|---|---|---|
| 2,500,989 | A | * | 3/1950 | Hartley et al. | 266/97 |
| D163,327 | S | * | 5/1951 | Rose | D34/15 |
| 2,667,397 | A | * | 1/1954 | Hallisey | 312/249.8 |
| 2,812,382 | A | * | 11/1957 | Michael | 381/334 |
| 4,098,416 | A | | 7/1978 | Fawley | |
| 4,205,937 | A | | 6/1980 | Fawley | |
| 4,253,716 | A | | 3/1981 | Turner, Jr. | |
| 4,432,470 | A | | 2/1984 | Sopha | |
| 4,457,527 | A | | 7/1984 | Lowery | |
| 4,625,949 | A | * | 12/1986 | Walker | 266/48 |
| 4,753,445 | A | | 6/1988 | Ferrare | |
| 5,071,148 | A | | 12/1991 | Salvucci, Sr. | |
| 5,307,839 | A | | 5/1994 | Loebker et al. | |
| 5,340,136 | A | | 8/1994 | MacNeil et al. | |
| 5,393,080 | A | | 2/1995 | Ross | |
| 5,431,422 | A | | 7/1995 | Gamache | |
| 5,570,895 | A | | 11/1996 | McCue et al. | |
| D392,081 | S | * | 3/1998 | Salvucci, Sr. | D34/27 |
| 5,799,958 | A | | 9/1998 | Bishop | |
| D423,173 | S | * | 4/2000 | Horner et al. | D34/24 |
| 6,047,983 | A | * | 4/2000 | Day, III | 280/652 |
| D443,744 | S | | 6/2001 | Intravatola | |

FOREIGN PATENT DOCUMENTS

| EP | P400378 | | 12/1990 |
|---|---|---|---|
| FR | 2640217 | | 6/1990 |
| JP | 5-139316 | * | 6/1993 |
| WO | WO 93/22176 | | 11/1993 |

* cited by examiner

Primary Examiner—Bryan Fischmann
(74) Attorney, Agent, or Firm—Daniel B. Schein, Esq.

(57) ABSTRACT

A gas cylinder cart comprises a frame defining at least one bay shaped to receive a cylinder, a control panel removably connected to the frame, and at least one gas control device mounted on the control panel. A method of reconfiguring the gas cylinder cart comprises disconnecting a first control panel from the frame and removably connecting a second control panel to the frame, wherein the first and second control panels comprise a first and second configuration of gas control devices arranged thereon respectively. Interchangeable control panels for a gas cylinder cart, and a new cart frame for use therewith are disclosed.

20 Claims, 7 Drawing Sheets

GAS CYLINDER CART WITH REMOVABLE CONTROL PANEL

RELATED APPLICATION DATA

This application claims priority of provisional application 60/322,711, filed Sep. 14, 2001.

FIELD OF THE INVENTION

The present invention relates generally to a cylinder cart, and in particular, to a gas cylinder cart having a removable control panel, and interchangeable control panels for gas cylinder carts.

BACKGROUND

Gas cylinder carts, and in particular portable gas cylinder carts, are typically used to provide access to various gases, such as air, at remote locations. For example, fire and rescue personnel use air supply carts to provide an air supply in locations where the ambient air supply may be limited and/or contaminated. In addition, such workers may also have the need for pressurized air to run various pneumatic tools, such as saws and pry devices. In other applications, construction and steel workers use such carts to transport various cylinders of welding gases and the like, and entertainers may use such carts to transport tanks of helium and the like.

High quality gas cylinder carts and other breathing air, ventilation and safety equipment are available from Air Systems, Inc., d.b.a. Air Systems International, Inc., 821 Juniper Crescent, Chesapeake, Va., 23320, U.S.A., and are viewable at the web site www.airsystems.com. Air Systems, Inc. may also be contacted via telephone at phone number 800-866-8100 or phone number 757-424-3967.

Typically, gas cylinder carts are configured to hold one or more cylinders of gas. Often, various pressure gauges, regulators and valves are operably connected to the cylinder to allow the operator to control the flow of gas from the cylinder to the user, whether for breathing or other uses. In such an embodiment, it can be difficult and time consuming to remove various control devices from the cylinder, once emptied, and reattach them to another cylinder.

In other known embodiments, the various pressure control devices are connected to a control panel, which forms part of the cart as shown for example in U.S. Pat. No. 5,570,895. Typically, however, the control panel is fixedly secured or integrated into the cart, such that the cart is provided with only a single configuration or particular arrangement of control devices. Accordingly, the cart cannot be readily reconfigured to accommodate additional control devices, such as additional air ports and/or regulators. Therefore, the user of such carts may be required to keep multiple carts in inventory in order to service their various needs, with an attendant increase in the costs associated with the purchase of additional carts and the storage space required therefore.

SUMMARY

Briefly stated, in one aspect, the invention is directed to a gas cylinder cart comprising a frame defining at least one bay shaped to receive a cylinder, a control panel removably connected to the frame, and at least one gas control device mounted on the control panel. In a preferred embodiment, the frame defines a pair of bays. Also in a preferred embodiment, a plurality of control devices are mounted on the control panel, including for example various gauges, pressure regulator controls and gas outlet ports.

In another aspect, a cart system includes a first control panel comprising a first configuration of gas control devices arranged thereon and a second control panel comprising a second configuration of gas control devices arranged thereon. The first and second control panels are each adapted to be removably connected to the frame. In a preferred embodiment, the second configuration of gas control devices is different than the first configuration of gas control devices. One of the first and second control panels is removably connected to the frame, while the other is maintained in inventory, or otherwise stored, until needed. In other preferred embodiments, additional control panels having other configurations of gas control devices can be incorporated into the system.

In another aspect, interchangeable control panels for gas cylinder carts are disclosed, wherein a substantially identical control panel can readily replace a defective or damaged panel or a control panel can be replaced with a control panel having a different configuration and functions with relative ease.

In yet another aspect, a method of reconfiguring a gas cylinder cart comprises disconnecting a first control panel from the frame and removably connecting a second control panel to the frame, wherein the first and second control panels comprise respectively a first and second configuration of gas control devices arranged thereon.

In yet another aspect, a frame includes a bottom portion defining in part at least one bay adapted to support a cylinder. The bottom portion comprises an outermost periphery defining in part a footprint of the frame. At least a portion of the periphery has a curved convex shape.

The gas cylinder cart and method for the reconfiguration thereof provide significant advantages. For example, the user can use and maintain in inventory a single frame, which is capable of being configured for multiple uses and applications. The user can then maintain one or more control panels in inventory, which control panels are configured for different gas use situations and environments. For example, and without limitation, the user can maintain one control panel configured for use with a pair of breathing air cylinders and which includes a pair of air outlet ports, and another control panel configured for use with a breathing air cylinder and a tool air cylinder and which includes a pair of outlet ports for each cylinder. In this way, a plurality of differently configured control panels can be maintained with minimal expense and storage requirements. In addition, each control panel is already configured with various control devices, which do not have to be removed and reattached each time a cylinder is replaced. Instead, the control panel, with the various control devices secured thereto, can be replaced as a unit. In one preferred embodiment, the removal of one control panel and the insertion of another control panel can be performed effortlessly simply by removing one or more fasteners and pivoting the control panel about an axis until it can be slid off of the axle.

In another aspect, the footprint of the frame, with its curved convex periphery, provides increased mobility in confined spaces. In particular, the peripheral surface or edge, which preferably follows the contour of the cylinder, eliminates any sharp protruding corners and minimizes the footprint. As such, the cart can be turned and maneuvered in confined spaces. In addition, the curved surface helps to prevent the frame from getting caught on various objects, and can reduce the severity of impact injuries to any person who may be inadvertently and accidentally bumped with the cart.

The present invention, together with further objects and advantages, will be best understood by reference to the following detailed description taken in conjunction with the accompanying drawings.

DETAILED DESCRIPTION OF THE PRESENTLY PREFERRED EMBODIMENTS

Referring to FIGS. 1 through 6, a gas cylinder cart 2 includes a frame 4 and a control panel 6. Referring to FIGS. 1–6, 11 and 12, the frame 4 includes a pair of opposite side support walls 5 each having a rear support wall portion 8 and a front support wall portion 12, and a bottom support wall 10, otherwise referred to as a floor. The side walls 5 and bottom wall 10 define a pair of cylinder bays 14, and form a recess 26 shaped to receive a bottom portion of a cylinder 30. The term "bay" should be broadly understood to mean any compartment or location where the cylinder is received or located. The frame 4 further comprises a central spine 16 centered between the side walls 5. The rear portion 12 of the each side wall 5 includes a curved portion 18 having a concave front or inner surface 20 that corresponds to and is shaped to mate with a cylinder 30. The spine 16 has a vertical slot 22 formed substantially along the length thereof. The curved portions 18 each have a top edge 60, which has a substantially horizontal outer portion that transitions to an upwardly curved portion that terminates proximate the top 62 of the spine 16.

The bottom support wall 10 has a peripheral edge 24, which defines in part the footprint of the cart. The term "footprint" refers to the area occupied by the cart superimposed on a planar surface when viewing the cart from a top view. The side walls 5 wrap around and are secured to the spine 16.

The front wall portion 12 of the side wall 5 also has an inner concave surface 28. In a preferred embodiment, each side wall 5 and its inner surfaces 20, 28 are continuous, and preferably form a cylinder having a circular cross-section with an inner diameter shaped to receive the gas cylinder 30. Each side wall 5, including the front wall portion 12 and the rear wall portion 8, also has and defines a continuous outer curved surface 36 which is preferably convex. The outer surface 36 of the side wall 5 along the front portion 12 thereof preferably follows the peripheral edge 24 of the bottom support wall 10 and further defines an outermost periphery and footprint of the cart.

Figure 1:
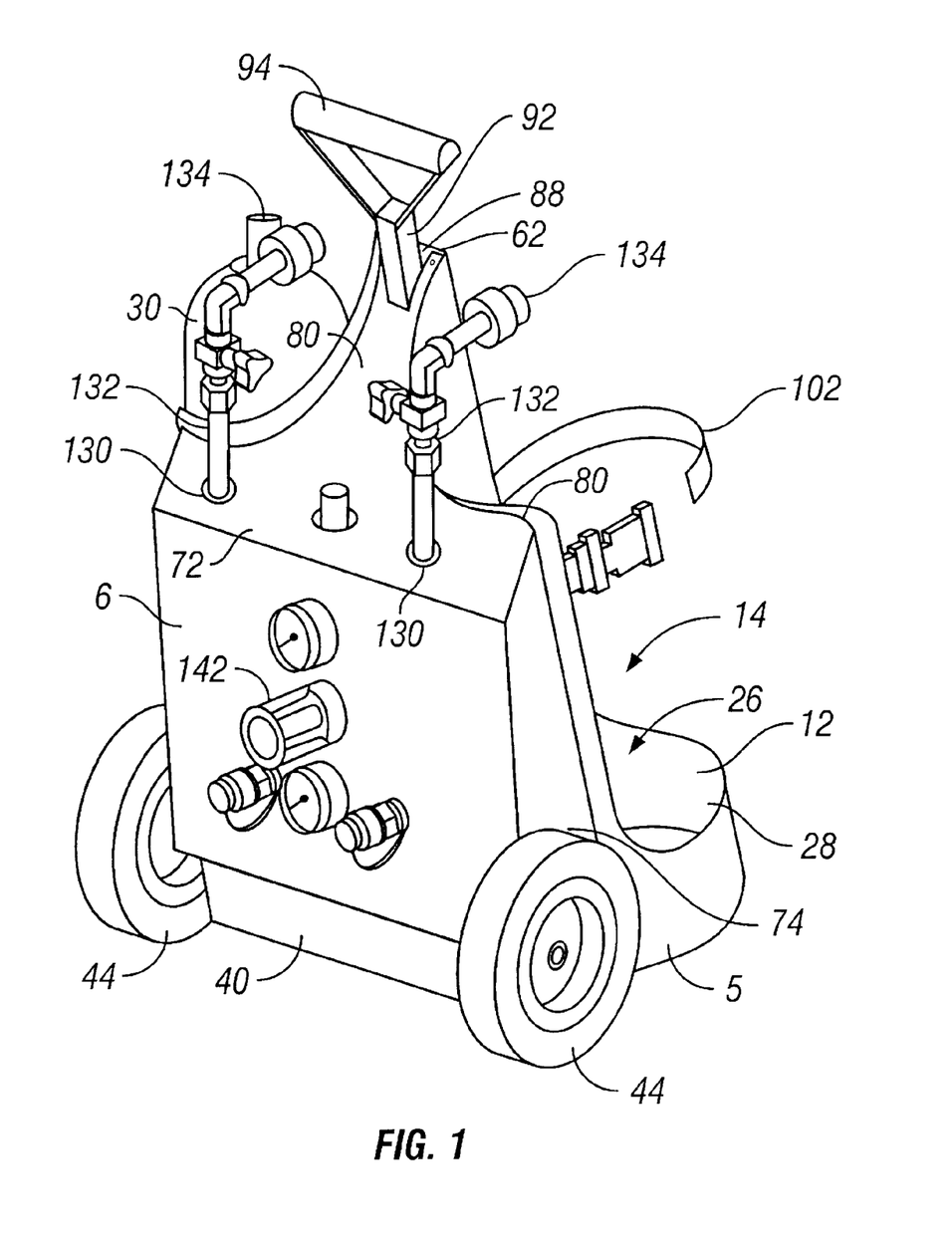
FIG. 1 is a rear perspective view of a gas cylinder cart configured with one embodiment of a control panel having a configuration of control devices and with a gas cylinder located in a left side bay.

As shown in FIG. 1, the cylinder 30 is preferably secured in one of the bays 14 with a strap 102, which wraps around the cylinder and the rear, outer surface 36 of the rear portion 8 of the side wall 5. Each strap 102 extends through a pair or openings 104, 106 formed in the side wall 5, which are preferably elongated so as to mate with the strap 102. The straps can be made from any suitable flexible material. For example, in one embodiment, the straps are made of nylon, and include a quick-release latch, or other securing mechanism, such as a VELCRO hook material. The openings 104, 106 formed on each of the opposite side walls 5 are spaced circumferentially along the curved rear portions 8 of the side walls at substantially the same vertical height, and preferably at the midpoint, or above the midpoint, of the height of the cylinder 30.

Figure 5:
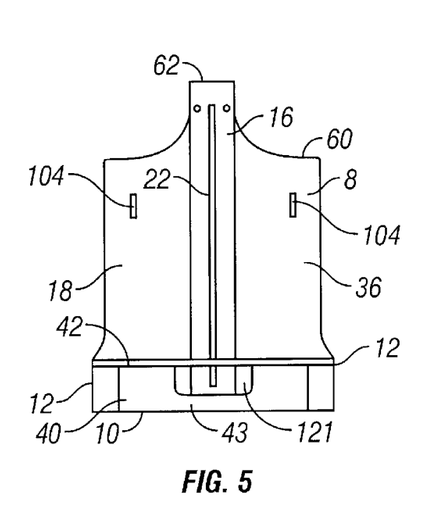
FIG. 5 is a rear elevated view of the cart frame.
Figure 6:
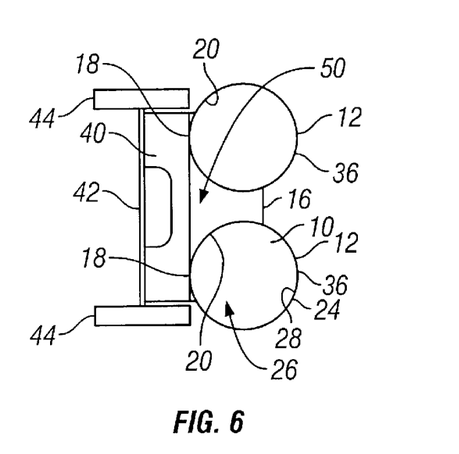
FIG. 6 is a plan top view of the cart frame.

Referring to FIGS. 1, 5 and 6, the outer rear surfaces 36 of the rear portion 8 of each side wall and the rear surface of the spine 16 form a cavity 50 therebetween. The control panel 6 is fitted against the side wall 5, and preferably against the outer surface 36 of the rear portion 8 thereof, to close the cavity 50. In particular, the control panel 6 includes a rear wall 70, a top wall 72 and a pair of side walls 74. Preferably, the top wall 72 is formed at an angle of about 35 degrees relative to the rear wall 70. The top wall 72 has a pair of opposite peripheral edges 80 that are contoured and shaped to mate with the outer surface 36 of each side wall along the rear portion 8 thereof. In one preferred embodiment, the top wall 72 has a T-shape. A forward end portion of the top wall 72 includes a pair of forwardly extending flanges 76 and a pair of downwardly extending flanges 78 connected to the flanges 76. The flanges 78 abut a rear surface of the spine 16. The flanges 76, 78 are spaced to form a slot or opening 82 therebetween. The flanges 78 are removeably or releasably secured to the spine 16 with fasteners 84. The terms "removably connected," "releasably connected" and variations thereof refers to two or more elements being connected or connectable such that the elements tend to remain connected absent a separation force applied to one or both of the elements, and where the elements are capable of being separated without rupture or permanent deformation of either of the elements, or the joint or connection therebetween. Permanent connection involves welding or bonding. For example, fasteners, including for example and without limitation screws, bolts and/or nuts, and or various snap fit mechanisms, can be used to releaseably connect the control panel to the frame without rupture or deformation of the parts or means for connecting same. Alternatively, the control panel, and for example the flanges, can be secured to the rear wall, or other portion of the frame, by a snap fit or other types of releasable connectors and releaseable engagement devices known to those of skill in the art.

The present invention pioneers the use of interchangeable control panels for gas cylinder carts, wherein a control panel can be releasably connected to a gas cylinder cart with a matching fitting or fittings and replaced with the releasable connection of another control panel having like or different valve and control configuration. Thus, in a preferred embodiment, a control panel for a gas cart is provided, which is releasably attachable to a gas cylinder cart having corresponding fittings to firmly hold the control panel in place while the cart is in use, wherein the panel comprises at least one of a gas control device, gas monitoring device, gas inlet port, gas outlet port, and gas line. The panel devices preferably includes one or more devices such as an air pressure gauge, a manifold for distribution or receipt of gases to or from different ports, an input port, an outlet port, a pressure regulator control, a visual warning device, an auditory warning device, a pressure relief valve, a gas inlet line, a gas directing switch, and a gas control valve. Preferably, inlet and outlet ports are fitted with quick connect and release fittings. The invention also permits the use of a control panel on different carts. Thus, in another aspect, the invention provides for an air cylinder cart having at least one fitting for releaseably attaching a control panel as described above wherein the control panel has at least one corresponding fitting.

Figure 2:
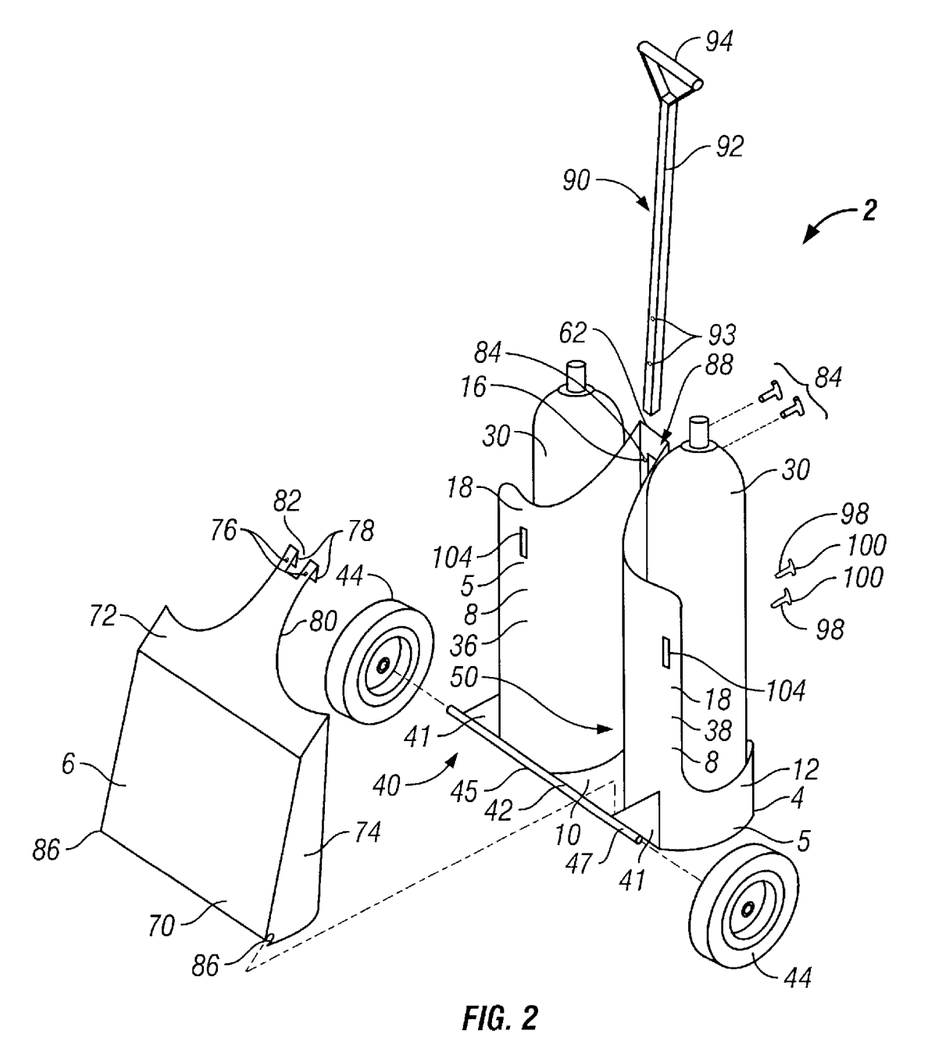
FIG. 2 is an exploded perspective view of the cart frame and control panel and with a pair of gas cylinders situated in the bays.
Figure 3:
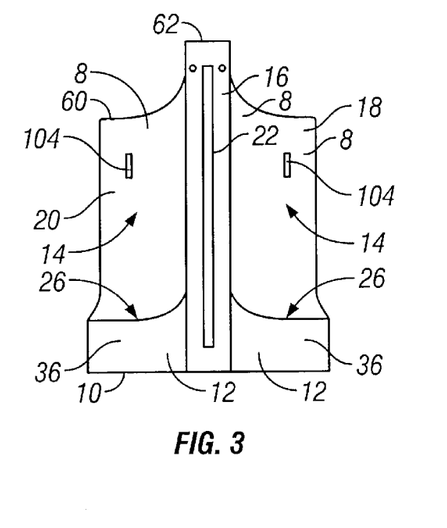
FIG. 3 is a front elevated view of the cart frame.
Figure 4:
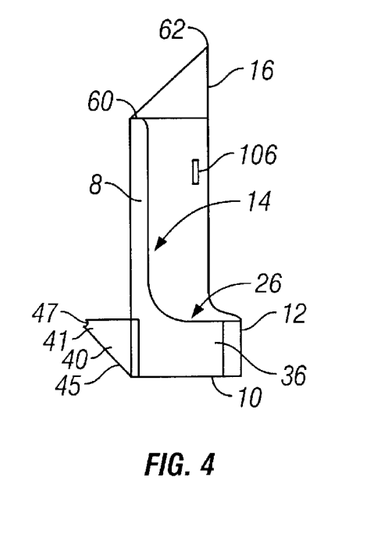
FIG. 4 is a right side elevated view of the cart frame, with the left side view being a mirror image thereof.
Figure 11:
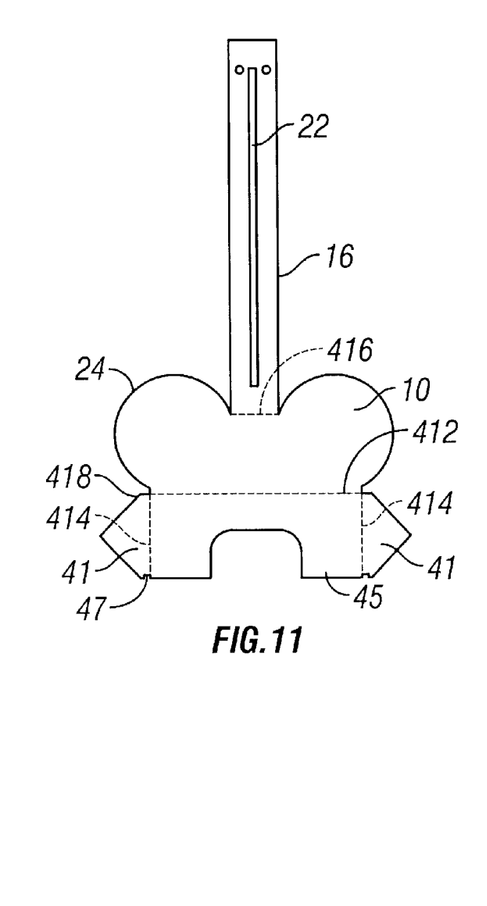
FIG. 11 is a flat pattern of a portion of the frame.

Referring to FIGS. 2, 4 and 11, a support 40 extends rearwardly from the rear wall portion 8. The support 40 includes a pair of opposite side walls 41 and a rear wall 43. Preferably, the side walls 41 each have a bottom edge 45 angled at about 45 degrees, with the rear wall 43 extending between and connected to the bottom edge 45. Alternatively, as shown in FIG. 1, the support 40 can be formed as a rectangular box. Referring to FIGS. 2, 4 and 11, each side wall 41 preferably includes a recess or groove 47 formed on an upper edge thereof at the outer end of the wall. An axle 42 is disposed in the grooves 47 and is fixedly secured to the support 40, for example by welding. An opening 121 is preferably formed in the rear wall 43 beneath the axle 42 at an approximate mid portion of the support 40 so as to provide the user with a place to grip and lift the frame. A pair of wheels 44 are rotatably mounted on opposite ends of the axle 42. It should be understood that the axle could alternatively be rotatably mounted to the frame, with the wheels fixedly or rotatably mounted on the axle.

As best shown in FIG. 6, the front wall preferably extends forwardly of the spine. In addition, the wheels 44 can be nested in a corner recess formed between the side walls 41 of the support 40 (and the side walls 74 of the control panel) and the rear portion 8 of the side wall 5, such that the wheels preferably do not extend laterally beyond, or substantially beyond, the outermost lateral sides of the side wall 5. In this way, the footprint of the cart is minimized and the wheels 44 are shielded by the side wall 5 from interfering with various objects in the path of the cart. Preferably, the cart has a width of about 18 and ½ inches and a depth of about 15 and ¼ inches.

Another embodiment of a cart having a curved side wall is shown in U.S. Pat. No. D443,744, the entire disclosure of which is hereby incorporated herein by reference.

Referring to FIGS. 1, 2 and 7–10, each side wall 74 on the control panel 6 has a slot 86 or opening formed therein along a bottom corner thereof adjacent the bottom edge of the rear wall 70. The slot preferably extends inwardly and upwardly in the side wall 74. The slot 86 is dimensioned and shaped to receive the axle 42. In particular, the control panel is supported on the axle 42 at the slot and is rotated about the axle 42 from a nonoperating position to an operating position such that the flanges 78 abut the spine and can be removeably affixed thereto. Because of the slanted orientation of the slot 86, the control panel cannot be removed from or be slid off of the axle 42 once the control panel is removeably attached to the spine in the operating position.

As best shown in FIGS. 1 and 2, when the control panel 6 is removably connected to the spine 16, the opening 82 between the flanges and the rear surface of the spine 16 forms a passageway 88. A handle 90 includes a stem portion 92 that is slideably received in the passageway 88 and a grippable portion 94 secured to the end of the stem portion. A pair of fasteners are engaged with the stem portion 92, preferably at openings 93, and include a shaft 98 that extends through the slot 22. A head 100 on each of the fasteners clamps the stem portion 92 to the spine. The fasteners can be loosened, thereby allowing the user to vertically adjust the height of the handle 90. In this way, the handle 90 can be moved downwardly within the passageway 88 for storage, or upwardly to a desired height suitable for a particular use or user. In the preferred embodiment, the handle is infinitely adjustable. In one preferred embodiment, the handle can be adjusted between a height of about 27 and 3/16 inches to about 40 and 9/16 inches. However, it should be understood that the handle and/or frame could be provided, for example and without limitation, with one or more detents, preferably spring loaded, or one or more lock pins/holes, so as to provide an alternative locking or securing mechanism for the handle. Alternatively, the handle can be fixedly secured to one or both of the control panel and frame such that it does not have any vertical adjustability.

Preferably, the frame, and its various components, the control panel and the handle are made of steel. However, it should be understood that the various components can be made of other rigid materials known to the those of skill in the art, including for example and without limitation, other types of metal, such as aluminum or titanium, hard plastic and/or fiberglass composites. In one preferred embodiment, the material, such as steel, can be powder coated, or alternatively can be treated and/or painted so as to increase its resistance to wear and corrosion.

Figure 10:
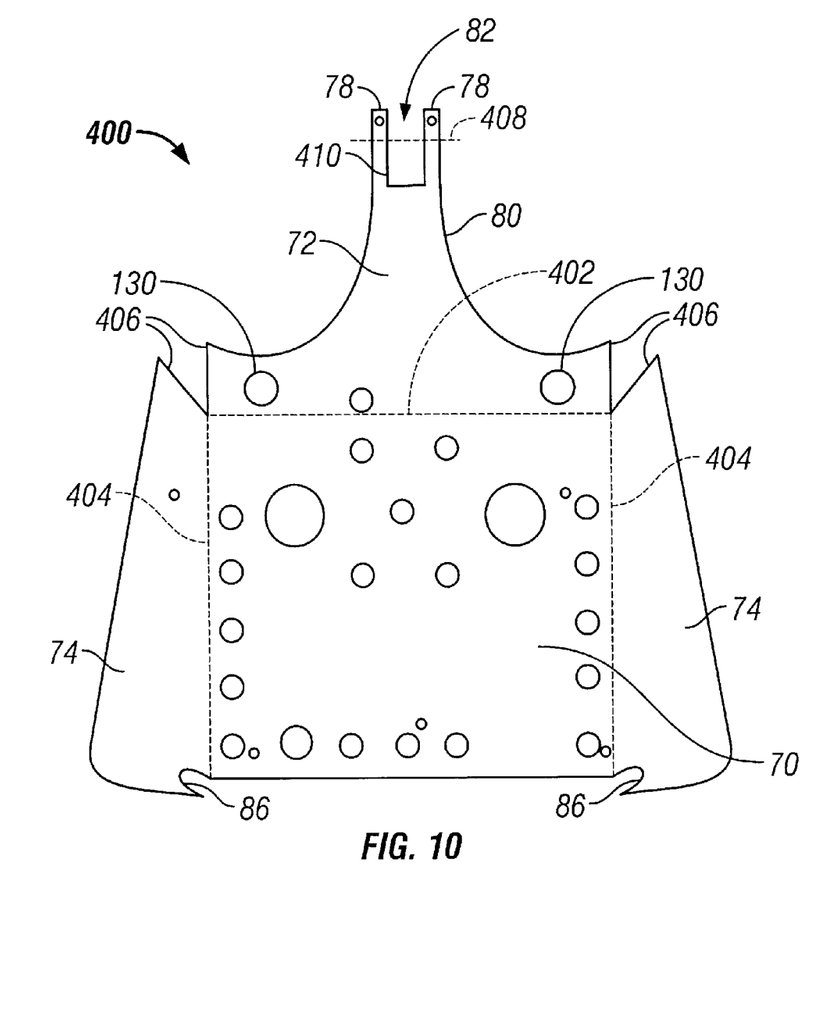
FIG. 10 is a flat pattern of the control panel.
Figure 12:
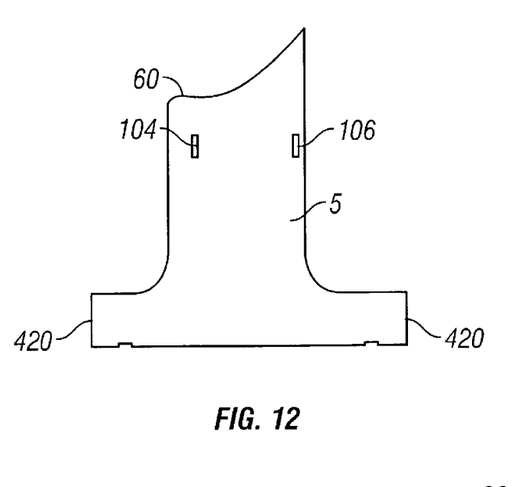
FIG. 12 is a flat pattern of another portion of the frame.
Figure 13:
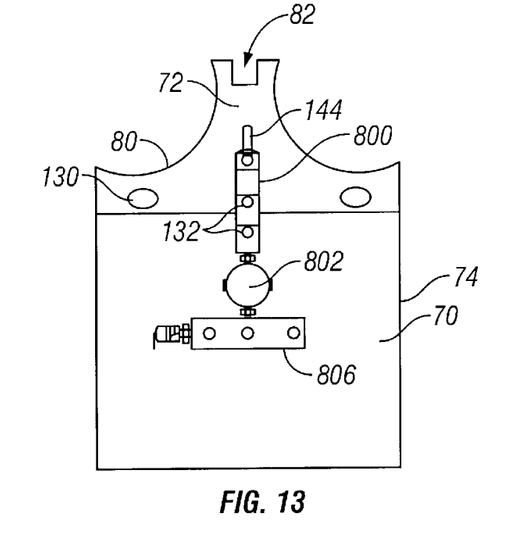
FIG. 13 is a front view of the control panel shown in FIG. 7.

Referring to FIGS. 10–12, various flat pieces of material can be formed into one or more pieces of the frame or control panel. For example, and referring to FIG. 10, a flat pattern 400 of the control panel is shown. A break or folding line 402 is formed between the top wall 72 and the rear wall 70. During the manufacture of the control panel 6, the top wall 72 is bent or folded about the break line 402 relative to the rear wall 70 to a desired angle, preferably 35 degrees, although other angles would be suitable. Likewise, the side walls 74 are folded or bent relative to the rear wall about break lines 404, preferably at an angle of about 90 degrees. After the top and side walls 72, 74 are folded about the break lines, side edges 406 of the top and side walls are substantially abutted and can be thereafter connected, for example by welding. In addition, flanges 78 are formed by folding or bending tabs 410 about a break line 408.

Referring to FIG. 11, a flat pattern of the spine 16 and bottom wall portions 10 of the frame is shown. The spine 16 is bent or folded relative to the bottom wall 10 about fold or break line 416, preferably at an angle of about 90 degrees. The rear wall 45 is bent or folded relative to the bottom wall 10 about fold or break line 412, preferably at an angle of about 45 degrees. Similarly, side walls 41 are bent or folded relative to the rear wall 45 about fold or break lines 414, preferably at an angle of about 90 degrees. The edges 418 of the side walls 41 are secured, for example by welding, to the side walls 5.

Referring to FIG. 12, a flat pattern of one of the side walls 5 is shown. The side wall is preferably roll formed into a cylinder, with the side edges 420 being connected, for example by welding.

It should be understood that the various angles of bending or folding described herein are meant to be illustrative, and that the various walls or members can be formed or bent at other angles suitable to form different shapes and configurations on the frame and control panel.

Referring to FIGS. 1, 7–10 and 13–17, the top wall 72 of the control panel is configured with one or more openings 130 therethrough. A pair of inlet lines 132 extend through the openings 130 and are connected to an intake manifold 800 secured to an inner front surface of the control panel. In one preferred embodiment, the inlet lines are made of aramid reinforced thermoplastic hose rated at 5000 psi (345 BAR). The inlet lines 132 each include a connector 134 that is releasably connectable to an outlet end of the cylinder. The inlet line can further include a valve 136, which can be opened to allow a gas to flow from the cylinder 30. It should be understood that the term "gas" means any fluid that has neither independent shape nor volume so that it occupies with almost complete uniformity the whole of any container, and includes, without limitation, air (i.e., pressurized ambient atmospheric mixture of oxygen, nitrogen, carbon dioxide, and other compounds), oxygen, helium and various welding gases. In various embodiments, the gas is maintained in a pressurized state in the cylinders. For example, the cylinders can hold pressurized air at a pressures of from about 0 to about 5500 psi, and more preferably at about 2216 psi and about 4500 psi, depending on the application. It should be understood that the cart and frame could be configured with a single bay, or more than two bays and the control panel preferably is configured with a corresponding number of inlet lines.

The control panel 6 is further configured with different configurations or arrangements of various gas control devices, which means any device or component employed to regulate, monitor or otherwise control the flow of gas from the cylinder to the end user, and which may include without limitation, various gauges, pressures regulators, manifolds, warning devices, valves, switches, pressure regulator controls and outlet and inlet ports. For example, the control panels are each configured with one or more gas outlet ports 138, through which the gas is released to the user, for example and without limitation as breathing air, tool air or welding gas. The outlet ports preferably are configured as quick connect sockets and include dust caps, which can be removably secured on the end of the outlet port. In particular, the user couples a supply line to the outlet port 138, which is connected to an outlet or distribution manifold 806. The supply line is then connected to an air operated device, such as a breathing apparatus or pneumatic tool. The pressure at which the gas is released through the outlet ports is controlled by one or more pressure regulators 802, which are also preferably connected to or mounted on the control panel 6. The pressure regulators can be mounted on the inner surface of the control panel such that they are maintained in the cavity 50 between the rear wall of the frame and the inner surface of the control panel 6, wherein they are protected. The pressure regulators are controlled by one or more pressure regulator controls 142, shown as including a knob, and are connected between the inlet and outlet manifolds 800, 806. Preferably, the manifolds are made of metal, such as an aluminum, although it should be understood that they can be made of other materials. In this way, the user can alter the pressure of the gas being released to the user through the outlet port 138. For example, breathing air can be regulated and provided to the end user at a pressure of between about 0 and about 125 psi and preferably at about 100 psi or below. Similarly, tool air can be regulated and provided to the end user at a pressure of between about 0 and about 300 psi, and preferably at about 250 psi or below. One or more pressure relief valves can also be connected or integrated into the pressure regulator and/or manifolds.

The design of the control panel may include an inlet port by which gas is supplied via the control panel from a source independently situated from the gas cart. By use of appropriate valves and manifolds, it is possible in an embodiment to recharge (i.e., refill) gas cylinders which are still mounted upon the cart.

The control panel 6 is also preferably configured with one or more pressure gauges 140, which indicate the pressure at which gas is being released through the outlet ports 138. In addition, one or more gauges 141 can indicate the pressure of the gas contained in the cylinders, or in an auxiliary tank.

The control panel 6 also can be configured with an inlet port 144, which preferably extends through an opening 146 in the top wall of the control panel and is connected to an inlet manifold 800. The inlet port 144 is intended to be connected to an auxiliary tank or cylinder not secured in one of the bays, although it should be understood that it could also be operably connected to one of the cylinders in the bays. For example, a tank on a fire engine holding a large volume of pressurized gas can be connected to the inlet port 144 and can be thereafter regulated using the control devices arranged on the control panel.

Preferably, a plurality of control panels 6, each having a different configuration or arrangement of gas control devices mounted thereon, are maintained by the user. The phrases "mounted on" or "mounted to" with respect to devices fixed to the control panel is distinguished herein from the phrase releaseably connection of the control panel to the cart, and means a fixed securement that is not intended to be removed during the normal use of the device, and can include for example attachment by way of fasteners, including bolts and/or nuts, welding, riveting, adhesives and other types of connections known to those of skill in the art. Therefore, for example, a gauge that is screwed onto a control panel is "mounted" thereon, even though it can be unscrewed and replaced with another gauge or other component. In contrast the control panel is not "mounted on" the cart but rather releaseably connected to the cart even if held thereto by a bolt and nut combination, as the invention provides for easy access to and operation of the fitting mechanism releaseably connecting the control panel to the cart.

Depending on the intended use, for example breathing air only, or breathing air and tool air, the cart 2 can be configured with a suitable control panel 6. Since each control panel 6 is removable, the user can easily remove one control panel and removably connect a second control panel as needed. In addition, control panels can be easily switched if one or more control devices malfunction thereon, thereby keeping the cart operational without having to troubleshoot the malfunction on the spot. In such a situation, it may be desired to maintain a plurality of control panels each having the same configuration of control devices.

Figure 7:
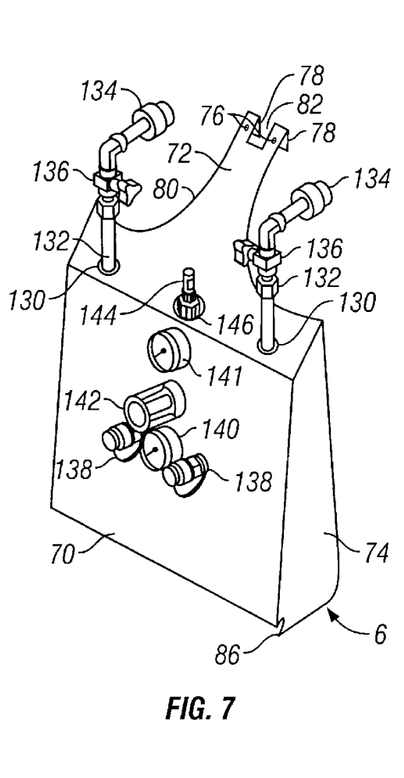
FIG. 7 is a rear view of a control panel having one configuration of control devices.
Figure 8:
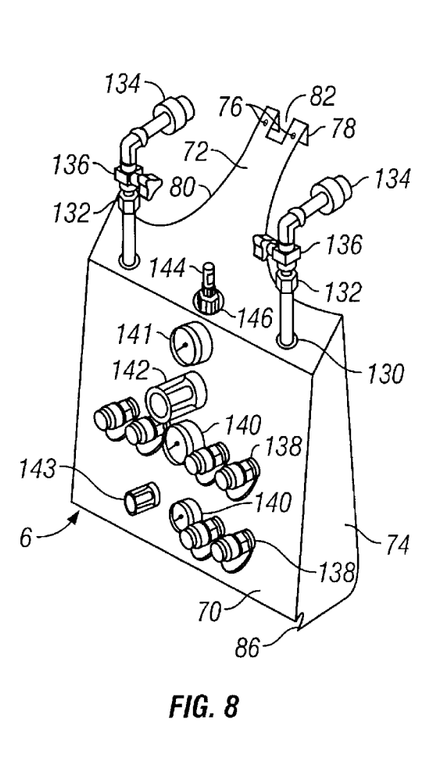
FIG. 8 is a rear view of a control panel having an alternative configuration of control devices.
Figure 9:
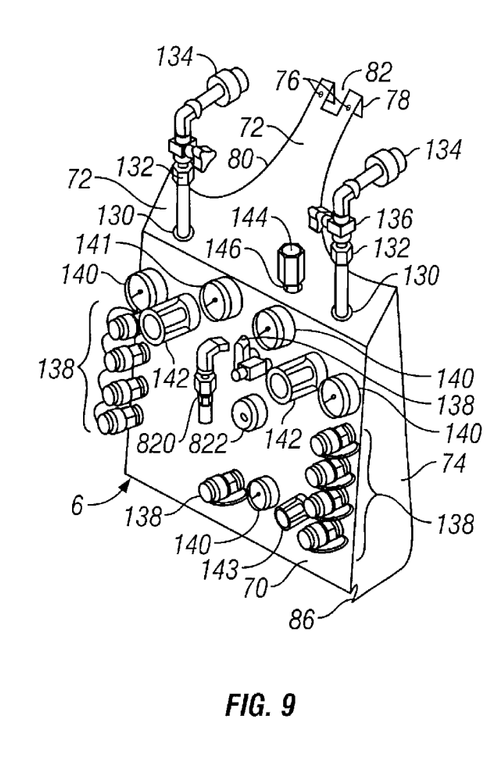
FIG. 9 is a rear view of a control panel having an alternative configuration of control devices.

Three exemplary embodiments of a control panel 6 are shown in FIGS. 7–9. It should be understood that the various control panel embodiments are meant to be illustrative, rather than limiting, and that any number of different control device configurations can be arranged on the control panel. For example, in first embodiment shown in FIGS. 7 and 13, the control panel control devices include a single inlet manifold 800, a pair of pressure gauges 140, 141, a pair of outlet ports 138, an inlet port 144, a pressure regulator 802, a single outlet manifold 806 and a pressure regulator control 142.

Figure 14:
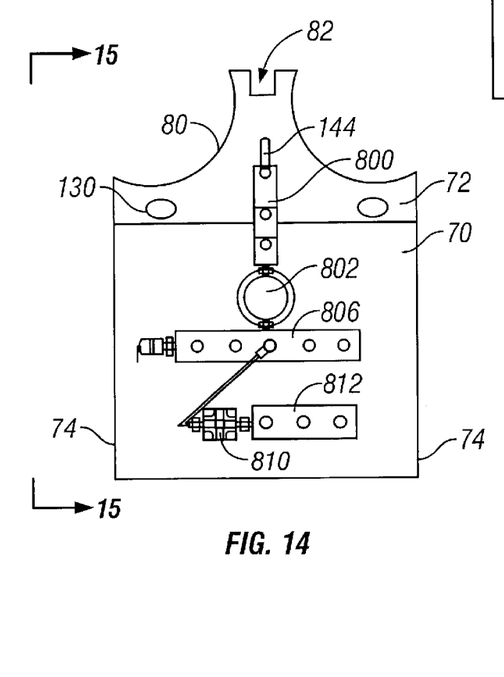
FIG. 14 is a front view of the control panel shown in FIG. 8.
Figure 15:
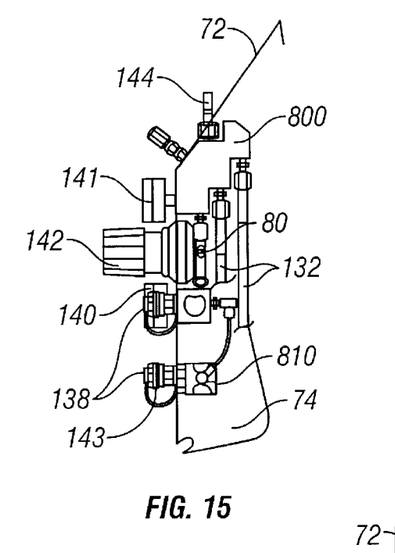
FIG. 15 is a side cross sectional view of the control panel shown in FIG. 8 taken along line 15—15 of FIG. 14.

In an alternative embodiment shown in FIGS. 8, 14 and 15, the control panel is configured with additional outlet ports 138, an additional output pressure gauge 140 and an additional or secondary pressure regulator 810, output manifold 812 and pressure regulator control 143. The secondary regulator is connected to the manifold 806, and can be used to further alter the output pressure in the manifold 812 and any connected outlet ports 138. The additional pressure gauge monitors the pressure in the secondary output manifold.

Figure 16:
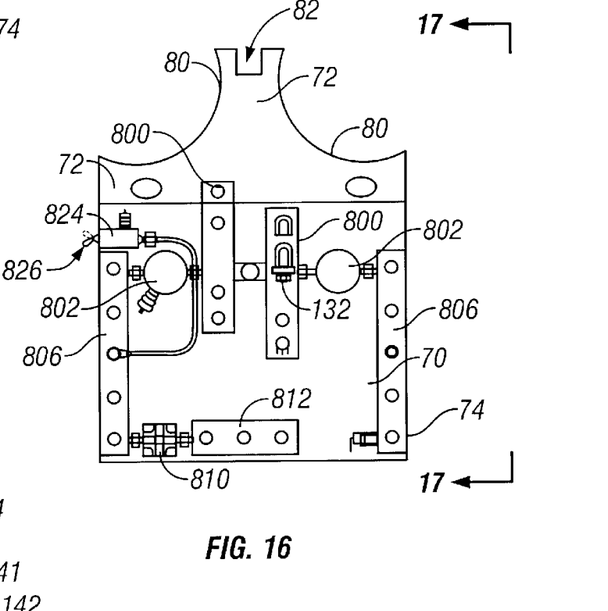
FIG. 16 is a front view of the control panel shown in FIG. 9.
Figure 17:
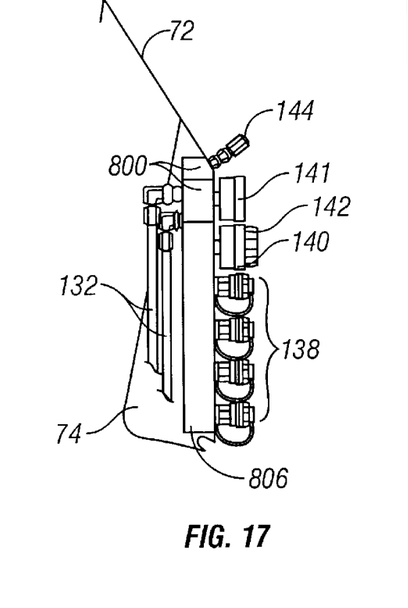
FIG. 17 is a side cross sectional view of the control panel shown in FIG. 9 taken along line 17—17 of FIG. 16.

In yet another alternative embodiment, shown in FIGS. 9, 16 and 17, the control panel is configured with a pair of pressure regulators 802, a pair of inlet manifolds 800 and a pair of primary outlet manifolds. One inlet manifold 800 is connected to the inlet port 144, while the other is connected to the inlet lines 132. A directional valve is connected between the inlet manifolds 800 and can be used to allow the inlet pressure to be directed from the onboard tanks, the auxiliary tank or both tanks. In this way, the cart, and in particular the control panel, can be used to provide gas from an auxiliary tank simultaneously with providing air from the onboard tanks. In addition, the control panel allows the user to provide the gases from each of the tanks at various pressures. A first warning device 820, shown as a pneumatic whistle, is preferably connected to one inlet manifold, while a second warning device 822, shown as a pneumatic bell is connected to the other inlet manifold. Preferably, different warning devices, or devices providing different auditory or visual warning signals, are used for the two inlet manifolds, so as to provide different warnings when the pressure in either the auxiliary tank or the onboard tanks is getting too low, or when the tanks reach a certain predetermined capacity. An additional output pressure gauge 140 and an additional or secondary pressure regulator 810, output manifold 812 and pressure regulator control 143 are connected to one of the primary output manifolds 806, and can be used to further alter the output pressure in the manifold 812. In addition, a pressure relief valve 824 is connected to a toggle switch 826, which allows the user to set at least two maximum pressures for a connected output manifold 806.

In operation, if a different control device system is desired, the user merely disconnects the cylinders 30 from the inlet lines 132, removes the fasteners 84, or otherwise disengages the releasable locking mechanism removably connecting the control panel 6 to the frame 4, and rotates or pivots the control panel 6 from an operating position, preferably with the various control devices mounted thereon, about the axle 42 until the slot 86 can be disengaged from or lifted off of the axle, wherein the control panel is in a nonoperating position. The replacement control panel is then slid onto or engaged with the axle 42 at the slot 86. The control panel is then rotated or pivoted about the axle to the operating position, wherein it is removably secured to the frame 4 with the fasteners 84.

Although the present invention has been described with reference to preferred embodiments, those skilled in the art will recognize that changes may be made in form and detail without departing from the spirit and scope of the invention. For example, in an alternative embodiment (not shown), more than one control panel can be connected to the cart frame by suitable size adjustment of the panels so that they can be mounted in a side by side manner on the axle. For example, separate control panels may be connected to separate gas cylinders. Also, the slot in the wall of the control panel can be replaced by other engaging means, such as tabs or flanges, which engage the frame of the cart. As such, it is intended that the foregoing detailed description be regarded as illustrative rather than limiting and that it is the appended claims, including all equivalents thereof, which are intended to define the scope of the invention.

What is claimed is:

1. A gas cylinder cart comprising:
   a frame defining at least one bay shaped to receive a cylinder;
   a control panel removably connected to said frame; and
   wherein said frame comprises a bottom wall and a side wall defining at least one bay, wherein said control panel is rotatably and removably connected to said bay.

2. The cart of claim 1, wherein said at least one gas control device comprises a plurality of said gas control devices mounted on said control panel.

3. The cart of claim 1, wherein said at least one gas control device comprises at least one device selected from the group consisting of a gauge, a pressure regulator control, a gas outlet port, a gas inlet port, and an inlet line.

4. The cart of claim 1, wherein said control panel further comprises an opening, and further comprising an inlet line extending through said opening, wherein said inlet line is adapted to be connected to a gas cylinder when placed in said at least one bay.

5. The cart of claim 1, wherein said side wall and said bottom wall, form at least one recess shaped to receive a bottom portion of a gas cylinder.

6. A gas cylinder cart comprising:
   a frame defining at least one bay shaped to receive a cylinder;
   a control panel removably connected to said frame; and at lea one gas control device mounted on said control panel;
   wherein said control panel comprises a slot and wherein said frame further comprises an axle, said slot being slidably and pivotally engaged with said axle.

7. The cart of claim 6, wherein said control panel can be pivoted about said axle between an operating position wherein said control panel is removably connected to said frame at a location spaced from said axle and a nonoperating position wherein said control panel can be removed from said frame by sliding disengagement of said slot from said axle.

8. A gas cylinder cart system configurable in at least two configurations, wherein the gas cylinder cart system comprises:
   a frame defining at least one bay shaped to receive a cylinder;
   a first control panel comprising a first configuration of at least one gas control device arranged thereon, wherein said first control panel is adapted to be removably connected to said frame; and
   a second control panel comprising a second configuration of at least one gas control device arranged thereon, wherein said second control panel is adapted to be removably connected to said frame;
   wherein one of said first and second control panels is removably connected to said frame.

9. The cart system of claim 8, wherein said first and second configurations of said gas control devices are different from each other and each comprises at least one device selected from the group consisting of a gauge, a pressure regulator control, a gas outlet port, a gas inlet port, and a gas inlet line.

10. The cart system of claim 9, wherein said frame comprises a bottom wall and a side wall defining said at least one bay, wherein one of said first and second control panels is removably connected to said side wall.

11. The cart system of claim 10, wherein said side wall and said bottom wall form at least one recess shaped to receive the bottom of a gas cylinder.

12. The cart system of claim 11, wherein each of said first and second control panels comprises a slot and wherein said frame further comprises an axle, said slot being slidably and pivotally engageable with said axle.

13. The cart system of claim 12, wherein one of said first and second control panels can be pivoted about said axle between an operating position wherein said control panel is removably connected to said frame at a location spaced from said axle and a nonoperating position wherein said control panel can be removed from said frame by sliding disengagement of said slot from said axle.

14. A method of reconfiguring a gas cylinder cart comprising:
providing a cart comprising a frame defining at least one bay shaped to receive a cylinder and a first control panel removably connected to said frame, wherein the first control panel comprises a first configuration of gas control devices arranged thereon; and
disconnecting the first control panel from the frame; and
removably connecting a second control panel to the frame, wherein the second control panel comprises a second configuration of gas control devices arranged thereon.

15. The method of claim 14, wherein the first and second configurations of said gas control devices each comprise at least one device selected from the group consisting of a gauge, a pressure regulator control, a gas outlet port, a gas inlet port, and an inlet line.

16. The method of claim 15, wherein each of the first and second control panels comprises at least one wall having a slot, and wherein the frame further comprises an axle, and wherein said step of disconnecting the first control panel from the frame comprises removing the axle from the slot of the first control panel, and wherein said step of removably connecting a second control panel to the frame comprises inserting the axle in the slot of the second control panel.

17. The method of claim 16, wherein said step of removing the axle from the slot of the first control panel comprises pivoting the first control panel about the axle in a first direction and wherein said step of removably connecting the second control panel to the frame comprises pivoting the second control panel about the axle in a second direction opposite the first direction.

18. A gas cylinder cart, comprising:
a frame,
wherein said frame comprises an axle, a fitting for releasable connection of said frame to a gas control panel, and at least one bay for receiving a gas cylinder,
wherein said axle permits slideable and pivotal engagement of a gas control panel having at least one corresponding slot in a wall thereof for receiving said axle, and wherein the panel can be pivoted about said axle between an operating position wherein the control panel is removably connected to the cart at a location spaced from said axle and a nonoperating position wherein the control panel can be removed from said frame by sliding disengagement of the slot from said axle.

19. The cart of claim 18, wherein said at least one bay is formed by a bottom portion comprising a periphery defining in part a foot print of said frame, wherein at least a portion of said periphery has a curved convex shape, and wherein at least a portion of said periphery edge defines a circular arc.

20. The cart of claim 19, further comprising a handle, said handle comprising a grippable portion and a stem portion, said stem portion being slidably engageable with said frame and having at least one fastener for connecting said stem portion to said frame by engagement therewith, wherein the relative position of said handle with respect to said frame can be adjusted by at least partially disengaging said at least one fastener from said frame, moving said stem portion relative to said frame, and engaging said fastener to said frame.

* * * * *